UNITED STATES PATENT OFFICE.

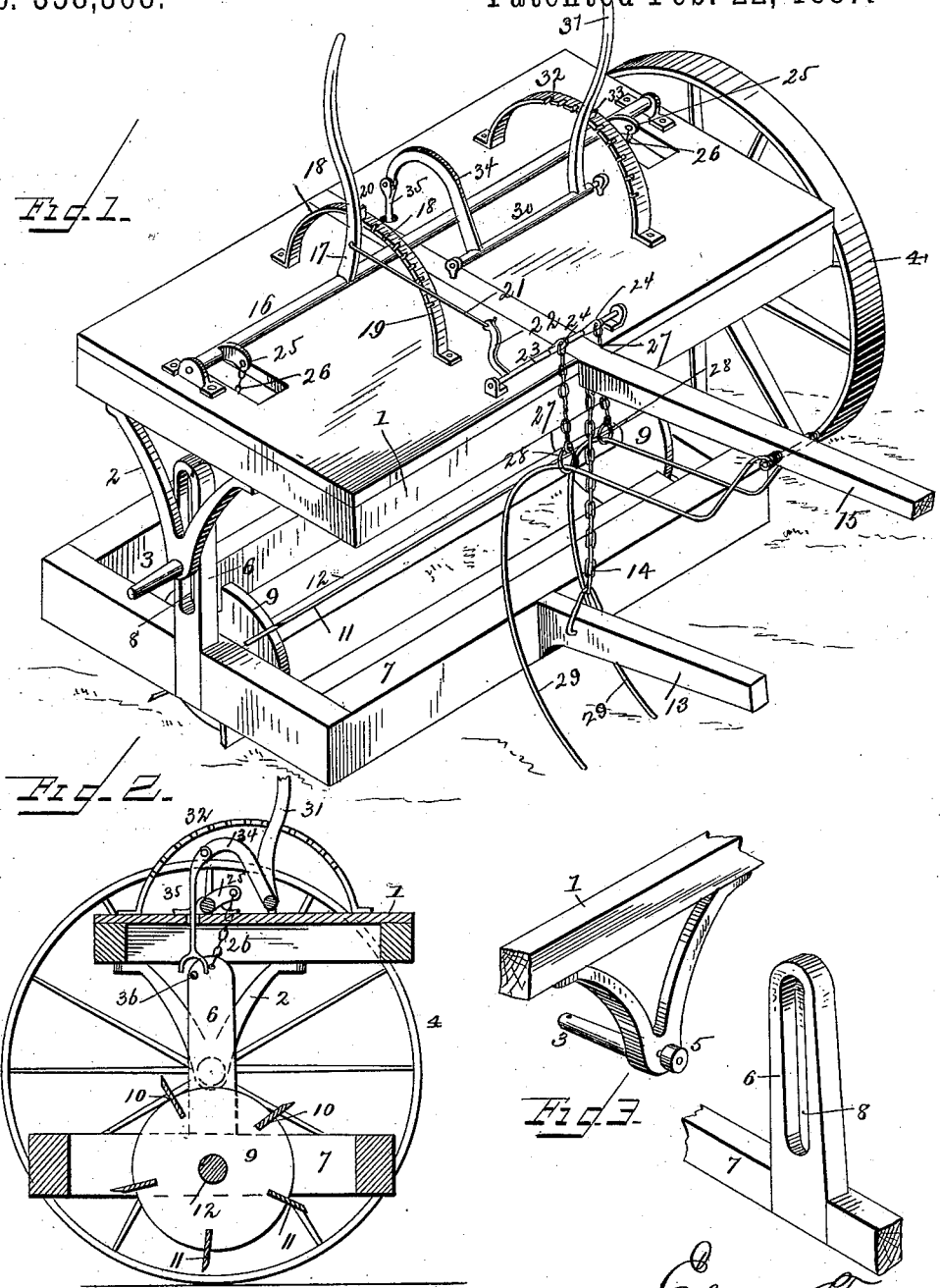

ELMER TOWNS, OF KENT, IOWA.

STALK-CUTTER.

SPECIFICATION forming part of Letters Patent No. 358,368, dated February 22, 1887.

Application filed November 4, 1886. Serial No. 217,969. (No model.)

*To all whom it may concern:*

Be it known that I, ELMER TOWNS, of Kent, in the county of Union and State of Iowa, have invented certain new and useful Improvements in Stalk-Cutters; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved stalk-cutter. Fig. 2 is a vertical sectional view of the same, and Fig. 3 is a perspective detail view of one of the axle-brackets and of one of the longitudinally-grooved uprights of the cutter-frame.

Similar numerals of reference indicate corresponding parts in all the figures.

My invention has relation to that class of stalk-cutters in which a frame having a drum formed by longitudinal radiating cutter-blades is supported below a wheeled frame; and it consists in the improved construction and combination of parts of such a stalk-cutter, as hereinafter more fully described and claimed.

In the accompanying drawings, the numeral 1 indicates a rectangular frame provided with downwardly-projecting brackets 2 2 upon its end pieces, which brackets are provided with outwardly-projecting stub-axles 3 3 at their lower ends, upon which stub-axles the wheels 4 are journaled. The inner sides of the downwardly-projecting brackets are provided with inwardly-projecting anti-friction rollers 5, pivoted in the ends of the brackets, and the longitudinally-grooved uprights 6 of the rectangular cutter-frame 7 slide with their grooves 8 upon the rollers.

The cutter consists of two disks, 9, having radiating slots 10 in their edges, in which the cutter-blades 11 are secured, and these disks are secured at the ends of a shaft, 12, journaled with its ends in the end pieces of the cutter-frame.

The forward end of the cutter-frame is provided with a short forwardly-projecting arm or tongue, 13, from the inner end of which projects a chain, 14, secured to the under side of the tongue 15 of the wheeled frame, while the end of the arm is provided with suitable means for attaching the draft-animals.

A transverse shaft, 16, is journaled to rock upon the upper side of the wheeled frame, and is provided with a hand-lever, 17, which may engage notches 18 in a curved bar, 19, secured longitudinally upon the top of the wheeled frame, with a laterally-projecting lip, 20; and a connecting-rod, 21, is pivoted with its rear end to this hand-lever, near the inner end of the same, and has its other forward end pivoted to an upwardly-projecting arm, 22, upon a transverse rock-shaft, 23, journaled at the forward edge of the frame and having two forwardly-projecting arms, 24. The rear transverse shaft is provided near its ends with arms 25, to the ends of which are secured chains 26, secured at their lower ends to the upper ends of the uprights upon the ends of the cutter-frame, the said arms projecting through the rectangular frame. The arms upon the forward shaft have chains 27 attached to their ends, which chains are formed with eyes 28 at their lower ends, through which eyes the rear portions of the horizontal arms of two hooks, 29, pass, the forward ends of the hooks being pivoted to the sides of the tongue.

A shaft, 30, is journaled to rock at the middle of the frame, and is provided with a hand-lever, 31, which engages a serrated or notched bar, 32, upon the frame with a laterally-projecting lip, 33, and with a rearwardly-projecting arm, 34, to the end of which is pivoted the upper end of a forked rod, 35, passing through the frame and bearing with its lower bifurcated end against a spring-rod, 36, secured at its ends in the upper ends of the uprights of the cutter-frame.

It will now be seen that by tilting the hand-lever upon the rear rock-shaft rearward the cutter-frame will be raised and the arms upon the forward rock-shaft will be raised, raising the chains having the eyes and the rear ends of the hooks with them, and by tilting the lever upon the rock-shaft at the middle of the frame rearward the forked rod may bear against the spring-rod, forcing the cutter-frame and the cutters firmly against the ground, thus forcing them to cut wet or tough stalks, which otherwise would remain uncut.

The hooks pivoted at the forward end of the frame will serve to straighten out the stalks, drawing them to lie parallel with the row along which the cutter is driven, so as to bring the stalks convenient for cutting.

It will be seen that by having the inwardly-projecting rollers projecting into the vertical grooves of the uprights of the cutter-frame, and having the said uprights sliding with their grooves upon the said rollers, the cutter-frame will be at liberty to slide up or down and to be tilted, but may not be disengaged from the wheeled frame, forming at all times a firmly-connected part of the same.

Having thus described my invention, I claim and desire to secure by Letters Patent of the United States—

1. In a stalk-cutter, the combination of a wheeled frame having inwardly-projecting rollers upon its wheel-bearing brackets with a cutter-frame having uprights at its ends formed with vertical grooves and sliding with the said grooves upon the rollers, as and for the purpose shown and set forth.

2. In a stalk-cutter, the combination of a frame having the wheels journaled upon stub-axles projecting from downwardly-projecting brackets, and having rollers pivoted in the inner sides of the lower ends of the brackets, and a cutter-frame having uprights at its ends formed with vertical grooves in their outer sides sliding upon these anti-friction rollers with the grooves, and having means for raising and depressing it, as and for the purpose shown and set forth.

3. In a stalk-cutter, the combination of a wheeled frame, a cutter-frame sliding with vertical guides under the frame, and having two uprights at its ends connected by a spring-rod, and a rock-shaft upon the frame having a hand-lever, and a rearwardly-projecting arm having a forked rod pivoted to its end passing through the frame and bearing against the spring-rod with its lower forked end, as and for the purpose shown and set forth.

4. In a stalk-cutter, the combination of a wheeled frame, a cutter-frame sliding with vertical guides under the frame, hooks pivoted with their forwardly-projecting arms upon the tongue of the wheeled frame and projecting with their hooked ends forward of the cutter-frame, a rock-shaft journaled transversely upon the frame and having a hand-lever, and downwardly-projecting arms having chains secured to the cutter-frame, a transverse shaft journaled at the forward edge of the frame and provided with an upwardly-projecting arm and with forwardly-projecting arms, a connecting-rod pivoted to the hand-lever and to the arm of the forward rock-shaft, and chains attached to the arms of the forward shaft and having eyes at their lower ends for the rear portions of the hooks, as and for the purpose shown and set forth.

In testimony that I claim the foregoing as my own I have hereunto affixed my signature in presence of two witnesses.

ELMER TOWNS.

Witnesses:
CHAS. W. MCDONALD,
ALEXR. C. BRICE.